US012003379B2

(12) United States Patent
Jiang et al.

(10) Patent No.: US 12,003,379 B2
(45) Date of Patent: Jun. 4, 2024

(54) SERVICE AND TOPOLOGY EXCHANGE PROTOCOL HAVING CLIENT-DRIVEN ACTIVE-ACTIVE REPOSITORIES WITH HIGH AVAILABILITY (71) Applicant: Juniper Networks, Inc., Sunnyvale, CA (US)

(72) Inventors: Tong Jiang, Fremont, CA (US); Chaohui Zhang, Foster City, CA (US); Abilash Menon, Boxborough, MA (US); John M. Peterson, Arlington, MA (US); Markus Jork, Andover, MA (US); Pranav Kethe-Sai, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 17/657,037

(22) Filed: Mar. 29, 2022

(65) Prior Publication Data

US 2023/0198848 A1 Jun. 22, 2023

Related U.S. Application Data (60) Provisional application No. 63/292,114, filed on Dec. 21, 2021.

(51) Int. Cl.
*H04L 41/12* (2022.01)
*H04L 12/28* (2006.01)
*H04L 41/02* (2022.01)
*H04L 41/22* (2022.01)

(52) U.S. Cl.
CPC .......... *H04L 41/12* (2013.01); *H04L 12/2874* (2013.01); *H04L 41/024* (2013.01); *H04L 41/22* (2013.01)

(58) Field of Classification Search
CPC .............................. H04L 41/12; H04L 41/024
USPC ......................................................... 709/223
See application file for complete search history.

(56) References Cited

U.S. PATENT DOCUMENTS

| 11,153,202 | B2 | 10/2021 | Kaplan et al. | |
| 2020/0366590 | A1* | 11/2020 | Kaplan | ................... H04L 45/02 |
| 2020/0366598 | A1* | 11/2020 | Kaplan | ................... H04L 45/34 |

OTHER PUBLICATIONS

Anonymous, "Step Solution Note", 128 Technology, Aug. 2017, 9 pp., Retrieved from the Internet on Jan. 4, 2021 from URL: https://www.128technology.com/wpcontent/uploads/2017/09/whitepaper_step_sept2017.pdf.

(Continued)

*Primary Examiner* — Sibte H Bukhari (74) *Attorney, Agent, or Firm* — Shumaker & Sieffert, P.A.

(57) ABSTRACT

Techniques are disclosed for promulgating service information and topology information in a network in a high availability manner. An example device is configured to create a first service and topology exchange protocol (STEP) document. The first STEP document includes service information and topology information. The example device is configured to send the first STEP document to a first STEP repository for forwarding to at least one subscribing network device. The example device is also configured to send the first STEP document to a second STEP repository for forwarding to the at least one subscribing network device.

20 Claims, 3 Drawing Sheets

(56) References Cited

OTHER PUBLICATIONS

Extended Search Report from counterpart European Application No. 22180178.0 dated Oct. 18, 2022, 11 pp.
Response to Extended Search Report dated Oct. 18, 2022, from counterpart European Application No. 22180178.0 filed Dec. 20, 2023, 18 Pages.

\* cited by examiner

SERVICE AND TOPOLOGY EXCHANGE PROTOCOL HAVING CLIENT-DRIVEN ACTIVE-ACTIVE REPOSITORIES WITH HIGH AVAILABILITY

This application claims the priority benefit of U.S. Provisional Patent Application Ser. No. 63/292,114, filed Dec. 21, 2021, the entire contents of which is incorporated herein by reference.

TECHNICAL FIELD

This disclosure generally relates to computer networks, and, more specifically, distribution of information within computer networks.

BACKGROUND

A computer network is a collection of interconnected computing devices that can exchange data and share resources. Example computing devices include routers, switches, and other Layer 2 (L2) network devices that operate within Layer 2 of the Open Systems Interconnection (OSI) reference model, i.e., the data link layer, and Layer 3 (L3) network devices that operate within Layer 3 of the OSI reference model, i.e., the network layer. Network devices within computer networks often include a control unit that provides control plane functionality for the network device and forwarding components for routing or switching data units.

The computing devices may establish a "network session" (also referred to herein as "session") to enable communication between devices on a computer network. A session may be unidirectional in that the session includes packets traveling in only one direction from a first device to a second device. For example, a session includes a forward packet flow originating from a first device and destinated for a second device. A different session may include a reverse packet flow originating from the second device and destined for the first device.

Alternatively, a session may be bidirectional in that the session includes packets traveling in both directions between a first device and a second device. For example, a session includes a forward packet flow originating from a first device and destinated for a second device and a reverse packet flow originating from the second device and destined for the first device. The forward and reverse packet flows of the session may be related to one another in that the source address and source port of the forward packet flow may be the same as the destination address and destination port of the reverse packet flow, and the destination address and destination port of the forward packet flow may be the same as the source address and source port of the reverse packet flow. To establish a session, computing devices may use one or more communication session protocols including Transmission Control Protocol (TCP), Transport Layer Security (TLS), User Datagram Protocol (UDP), Internet Control Message Protocol (ICMP), etc.

Service and topology exchange protocol (STEP) is a protocol that may be used to exchange service and topology information within a network. A network device, such as a router, may send (e.g., publish) service and topology information via a STEP document to an active repository or a proxy (e.g., standby) STEP repository. The active and proxy STEP repositories may exchange the STEP document therebetween so as attempt to build an identical repository for high availability redundancy purposes. Additionally, the active repository may send STEP documents associated with other network devices to the network device for which the network device subscribes. The network device may thereby obtain service and topology information relating to other network devices.

SUMMARY

Service and topology exchange protocol (STEP) is a protocol that may be used to exchange service information and topology information within a network. Network devices, such as service-based routers, may exchange their service information and topology information via a STEP repository server (herein also called a STEP repository). For example, a network device may send (e.g., publish) service and topology information via a STEP document to a STEP repository. This STEP repository may contain all documents published by the service-based routers in the network.

In order to achieve high availability, a network may include a redundant STEP repository. This may include a typical client/server architecture which allows each network device to publish their learned/configured service information and topology information to a STEP repository. Each network device may subscribe to other network devices' published STEP documents to learn the overall network and service topology. The traditional high availability solution is replicate the STEP repository across two or more STEP repositories (e.g., an active STEP repository and one or more redundant (e.g., standby or proxy) STEP repositories. The active or proxy STEP repository may exchange the STEP documents therebetween so as to attempt to build an identical repository for redundancy purposes. These STEP repositories are traditionally located in different parts of the network (e.g., not collocated) and, as such, connectivity between STEP repositories, as well as connectivity between session-based routers and the STEP repositories is not guaranteed all of the time, which may cause issues in promulgating the service information and topology information throughout the network. For example, if a connection between a first network device and the STEP repository it is otherwise connected to is lost, that first network device would be unable to publish any STEP documents or receive any STEP documents while the connection is down. This may negatively affect network efficiency as the first network device would not be aware of any changes in service information and/or topology information from other network devices and the other network devices would not be aware of any changes in service information and/or topology information from the first network device.

In general, the disclosure describes techniques for exchanging service and topology information within a network via an active-active STEP repository configuration. The network may include two or more STEP repositories which each may be active. A network device, such as a session-based router, may send service information and topology information to more than one STEP repository, for example, in the form of a STEP document. The network device may also receive service and topology information (e.g., in the form of STEP documents) originating from other network devices, to which the network device subscribes, from more than one STEP repository. In this manner, if a connection is lost between a first network device and a first active STEP repository, service information and topology information may still be promulgated through the network via another active STEP repository.

The network device may use received service information and topology information to build or update a service and topology database. The network device may use the database to build a shortest path first (SPF) routing table which the network device may use when determining how to route sessions or packets through the network.

The techniques of the disclosure may provide specific improvements to the computer-related field of computer networking that have practical applications. For example, the techniques disclosed herein may enable proper distribution of service information and topology information in the network even when connectivity between a network device and a STEP repository or between STEP repositories is lost or a STEP repository is down, thereby improving the routing of network traffic in terms of latency and network efficiency.

In one example, this disclosure describes a device comprising one or more processors and memory coupled to the one or more processors, the memory storing instructions that upon execution cause one or more processors to: create a first service and topology exchange protocol (STEP) document, the first STEP document comprising service information and topology information; send the first STEP document to a first STEP repository for forwarding to at least one subscribing network device; and send the first STEP document to a second STEP repository for forwarding to the at least one subscribing network device.

In one example, this disclosure describes a method comprising: creating, by one or more processors of a device, a first service and topology exchange protocol (STEP) document, the first STEP document comprising service information and topology information; sending, by the one or more processors of the device, the first STEP document to a first STEP repository for forwarding to at least one subscribing network device; and sending, by the one or more processors of the device, the first STEP document to a second STEP repository for forwarding to the at least one subscribing network device.

In another example, this disclosure describes a non-transitory computer-readable storage medium storing instructions, which, when executed, cause one or more processors to: create a first service and topology exchange protocol (STEP) document, the first STEP document comprising service information and topology information; send the first STEP document to a first STEP repository for forwarding to at least one subscribing network device; and send the first STEP document to a second STEP repository for forwarding to the at least one subscribing network device.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Figure 1:
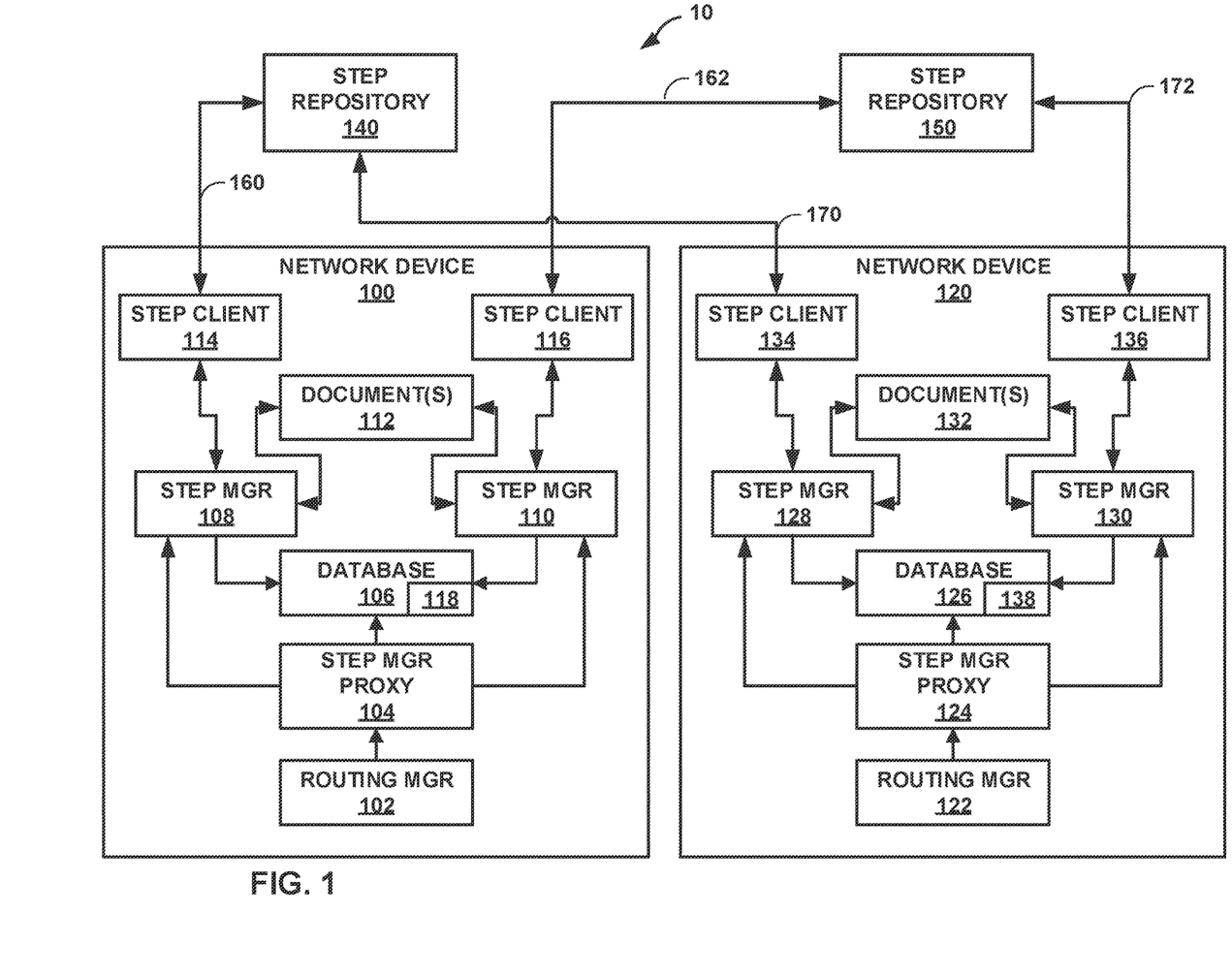
FIG. 1 is a block diagram illustrating an example computer network in accordance with the techniques of the disclosure.

FIG. 1 is a block diagram illustrating an example network according to the techniques of this disclosure. Network 10 includes network device 100, network device 120, service, topology exchange protocol (STEP) repository 140, and STEP repository 150. STEP repository 140 and STEP repository 150 may be said to be active-active, as both STEP repository 140 and STEP repository 150 are each active devices, rather than one being active and the other being a standby or proxy device. In some examples, network device 100 and network device 120 may be session-based routers, such as secure vector routers by Juniper Networks, Inc.

Although, not necessarily depicted, network 10 may include additional network devices, such as, for example, routers, switches, gateways, bridges, hubs, servers, firewalls or other intrusion detection systems (IDS) or intrusion prevention systems (IDP), computing devices, computing terminals, printers, other network devices, or a combination of such devices. Network 10 may be a public network (e.g., the Internet), an enterprise network, such as a branch network, a data center network, a service provider network, an Internet Service Provider network, or other type of network. In some examples, network 10 may be a collection of networks that provide wide area network (WAN) connectivity to client devices (not shown) which may be coupled to network device 100 or network device 120.

While described primarily as being session-based routers, network device 100 and network device 120 may be any type of network device, such as switches, routers, gateways, or other suitable network devices, that may send and receive network traffic.

In some examples, network 10 represents one or more publicly accessible computer networks that are owned and operated by one or more service providers. Although network 10 is illustrated in the example of FIG. 1 as a single network, in other examples network 10 may alternatively include multiple service provider networks that provides connectivity between network device 100 and network device 120. A service provider is usually a large telecommunications entity or corporation.

In some examples, network device 100 and network device 120 may implement a stateful, session-based routing scheme that enables each of network device 100 and network device 120 to independently perform path selection and traffic engineering. The use of session-based routing may enable network device 100 and network device 120 to eschew the use of a centralized controller, such as a Software-Defined Networking (SDN) controller to perform path selection and traffic engineering. In this way, routers such as network device 100 and network device 120 may be more efficient and scalable for large or distributed networks where the use of an SDN controller would be infeasible. Furthermore, the use of session-based routing may enable network device 100 and network device 120 to eschew the use of tunnels, thereby saving considerable network resources by obviating the need to perform encapsulation and decapsulation at tunnel endpoints. In some examples, network device 100 and network device 120 implement session-based routing as Secure Vector Routing (SVR), provided by Juniper Networks, Inc. In some examples, network device 100 and network device 120 include session-based routers, such as Ethernet over SVR (EoSVR) routers.

In the example of FIG. 1, STEP manager 108 and/or STEP manager 110 of network device 100 may create and maintain document(s) 112. Document(s) 112 may include a STEP document including service information and topology information relating to network device 100. Such information may include information regarding services and neighboring network devices known to network device 100. For example, network device 100 may learn from border gateway protocol (BGP) routes information regarding services, protocols, and topology of neighboring network devices (not shown) or network device 120. Network device 100 may compile such information into an initial STEP document of STEP document(s) 112 and publish or send the initial STEP document to STEP repository 140 and STEP repository 150. In some examples, an initial STEP document of STEP document(s) 112 may include all known service information and topology information.

When service information and/or topology information known by network device 100 changes, STEP manager 108 and/or STEP manager 110 may create an additional STEP document and publish or send the additional STEP document to STEP repository 140 and STEP repository 150. In some examples, STEP documents created after the initial document of STEP document(s) 112 may include a patch including deltas or changes from a last document of STEP document(s) 112 or deltas or changes from the initial STEP document of STEP document(s) 112, such as a new service, the end of a service, a newly discovered neighboring device, or the deletion of a no longer connected neighboring device. In some examples, STEP document(s) 112 may take the form of JavaScript Object Notation (JSON) document(s). When creating STEP document(s) 112, network device 100 may include a sequence number, time stamp, or other version identifier which another network device, such as network device 120, may use to determine a most recent STEP document of STEP document(s) 112 from network device 100.

STEP manager 108 may interact with STEP client 114 to initiate a connection 160 with STEP repository 140. Connection 160 may be a two-way transmission control protocol (TPC) connection. In some examples, FlatBuffers may be used to communicate over connection 160. STEP manager 108 may send STEP document(s) 112 to STEP repository 140 via STEP client 114 and connection 160. Similarly, STEP manager 110 may interact with STEP client 116 to initiate a connection 162 with STEP repository 150. Connection 162 may be a two-way TPC connection. In some examples, FlatBuffers may be used to communicate over connection 162. STEP manager 110 may send STEP document(s) 112 to STEP repository 150 via STEP client 116 and connection 162. In this manner, both STEP repository 140 and STEP repository 150 may receive STEP document(s) 112.

STEP client 114 may receive STEP documents from STEP repository 140 originating from or associated with other network devices, for example, to which network device 100 is subscribed via connection 160. For example, STEP repository 140 may send to STEP client 114 STEP document(s) 132 that STEP repository 140 may receive from network device 120. STEP client 116 may receive documents from STEP repository 150 originating from or associated with other network devices, for example, to which network device 100 is subscribed. For example, STEP repository 150 may send, via connection 162 and to STEP client 116, STEP document(s) 132 that STEP repository 150 may receive from network device 120.

STEP client 114 may send any received documents from STEP repository 140 to STEP manager 108, which in turn, may send the received documents to database 106. STEP client 116 may send any received documents from STEP repository 150 to STEP manager 110, which in turn, may send the received documents to database 106. For example, STEP manager 108 and STEP manager 110 may save the received documents in database 106. Database 106 may build a topology using the latest version of the saved STEP documents. To determine what is the latest version of the saved STEP documents, database 106 may use the sequence numbers, time stamps, or other version identifiers associated with the saved STEP documents. In some examples, database 106 may be a link state database (LSDB). In some examples, database 106 may build or update a routing table based on the information in the received documents. For example, if the received STEP document is a first received STEP document, database 106 may build the routing table. If the received STEP document is representative of deltas or change from an earlier received STEP document, database 106 may update the routing table. In some examples, database 106 may build a topology map 118 to calculate routes. In some examples, topology map 118 is an LSDB—shortest path first (SPF) topology map. In other examples, topology map 118 is not an LSDB—SPF topology map. In some examples, whenever new STEP documents are published or received, database 106 may update itself and update topology map 118.

Routing manager 102 may interact with STEP manager proxy 104 to determine how to route packets based on information in database 106 and control, via STEP manager proxy 104, the functions of STEP manager 108 and STEP manager 110. As shown in FIG. 1, network device 100 includes two STEP managers and two STEP clients. Such STEP managers and STEP clients facilitate the publishing of and subscribing to STEP documents for the two shown STEP repositories, STEP repository 140 and STEP repository 150. In the example where there are additional STEP repositories, network device 100 may include additional STEP managers and STEP clients that facilitate the publishing of and subscribing to STEP documents for the additional STEP repositories. For example, network device 100 may read configuration information and create STEP manager 108, STEP manager 110, STEP client 114, and STEP client 116 based on the configuration information. For example, the configuration information may indicate that there are two active STEP repositories in network 10.

Similarly, STEP manager 128 and/or STEP manager 130 of network device 120 may create and maintain document(s) 132 and publish or send the initial STEP document to STEP repository 140 and STEP repository 150. Document(s) 132 may include a STEP document including service information and topology information relating to network device 120. Such information may include information regarding services and neighboring network devices known to network device 120. In some examples, an initial document of document(s) 132 may include all known service information and topology information.

When service information and/or topology information known by network device 120 changes, STEP manager 128 and/or STEP manager 130 may create an additional STEP document and publish or send the additional STEP document to STEP repository 140 and STEP repository 150. In some examples, documents created after the initial document of document(s) 132 may include a patch including deltas or changes from a last document of document(s) 132 or deltas or changes from the initial document of document(s) 132, such as a new service, the end of a service, a newly discovered neighboring device, or the deletion of a no longer connected neighboring device. In some examples, document(s) 132 may take the form of JavaScript Object Notation (JSON) document(s). When creating STEP document(s) 132, network device 120 may include a sequence number, time stamp, or other version identifier which another network device, such as network device 100, may use to determine a most recent STEP document of STEP document(s) 132 from network device 120.

STEP manager 128 may interact with STEP client 134 to initiate connection 170 with STEP repository 140. Connection 170 may be a two-way TPC connection. In some examples, FlatBuffers may be used to communicate over connection 170. STEP manager 128 may send document(s) 132 to STEP repository 140 via STEP client 134 and connection 170. STEP manager 130 may interact with STEP client 136 to initiate connection 172 with STEP repository 150. STEP manager 130 may send document(s) 132 to STEP repository 150 via STEP client 136 and connection 172. In this manner, both STEP repository 140 and STEP repository 150 may receive document(s) 132.

STEP client 134 may receive documents from STEP repository 140 originating from or associated with other network devices, for example, to which network device 120 is subscribed via connection 170. For example, STEP repository 140 may send to STEP client 134 STEP document(s) 112 that STEP repository 140 may receive from network device 100. STEP client 136 may receive STEP documents from STEP repository 150 originating from or associated with other network devices, for example, to which network device 120 is subscribed. For example, STEP repository 150 may send, via connection 172 and to STEP client 136, STEP document(s) 112 that STEP repository 150 may receive from network device 100.

STEP client 134 may send any received STEP documents from STEP repository 140 to STEP manager 128, which in turn, may send the received STEP documents to database 126. STEP client 136 may send any received STEP documents from STEP repository 150 to STEP manager 130, which in turn, may send the received STEP documents to database 126. For example, STEP manager 128 and STEP manager 130 may save the received STEP documents in database 126. Database 126 may build a topology using the latest version of the saved documents. To determine what is the latest version of the saved STEP documents, database 126 may use the sequence numbers, time stamps, or other version identifiers associated with the saved STEP documents. In some examples, database 126 may be an LSDB. In some examples, database 126 may build or update a routing table based on the information in the received STEP documents. For example, if the received STEP document is a first received STEP document, database 126 may build the routing table. If the received STEP document is representative of deltas or change from an earlier received STEP document, database 126 may update the routing table. In some examples, database 126 may build a topology map 138. In some examples, topology map 138 is an LSDB—SPF topology map. In other examples, topology map 138 is not an LSDB—SPF topology map. In some examples, whenever new STEP documents are published or received, database 126 may update itself and update topology map 138.

Routing manager 122 may interact with STEP manager proxy 124 to determine how to route packets based on information in database 126 and control, via STEP manager proxy 124, the functions of STEP manager 128 and STEP manager 130. As shown in FIG. 1, network device 120 includes two STEP managers and two STEP clients. Such STEP managers and STEP clients facilitate the publishing of and subscribing to STEP documents for the two shown STEP repositories, STEP repository 140 and STEP repository 150. In the example where there are additional STEP repositories, network device 120 may include additional STEP managers and STEP clients that facilitate the publishing of and subscribing to STEP documents for the additional STEP repositories. For example, network device 120 may read configuration information and create STEP manager 128, STEP manager 130, STEP client 134, and STEP client 136 based on the configuration information. For example, the configuration information may indicate that there are two active STEP repositories in network 10.

In some examples, network device 120 may be an active network device. In other examples, network device 120 may be a standby network device. In the example that network device 120 is a standby network device, database 126 may not be built until network device 120 becomes an active network device.

For example, each network device (e.g., network device 100 and network device 120) may establish STEP connections to both (or in some examples, each) STEP repositories (e.g., STEP repository 140 and STEP repository 150). Each network device may publish or send an initial STEP document containing information regarding service information and topology information known to the network device to both or each of the STEP repositories. Each network device may publish or send STEP documents including changes or deltas to service information and/or topology information to both or each STEP repository. Each network device may subscribe to interested STEP documents of other routers from both or each STEP repository. In this manner, each network device may receive from both or each STEP repository, STEP documents, such as an initial STEP document and/or STEP documents including changes or deltas to service information and/or topology information from other network device(s). A network device, such as network device 100, may then use received STEP documents to build or create the service and topology database, which may be an LSDB, based on information within the STEP documents. The network device may take advantage of the fact that STEP document changes or deltas for a given other network device from both or each STEP repository are always from the same other network device. According to the techniques of this disclosure, each network device is responsible for replicating the service information and topology information on both or each STEP repository and is also responsible for merging changes or deltas from both or each STEP repository to construct a final data set (e.g., LSDB) locally. Thus, instead of the STEP repositories being responsible for the redundancy of the service information and topology information in the network (e.g., an active and standby STEP repository as in a traditional implementation), each network device (e.g., router) is responsible for such redundancy.

An arrangement, such as that of the example of FIG. 1, provides high availability to the service and routing information of network device 100 and network device 120. For example, if STEP repository 140 goes down, network device 100 and network device 120 may continue to send and/or receive STEP documents to/from STEP repository 150. If STEP repository 150 goes down, network device 100 and network device 120 may continue to send and/or receive STEP documents to/from STEP repository 140. Additionally, if connection 160 is lost, network device 100 may still publish or send STEP document(s) 112 to STEP repository 150 via connection 162 and/or receive STEP document(s) 132 from STEP repository 150 via connection 162. This arrangement also permits network device 120 to continue to receive STEP document(s) 112 from STEP repository 150 via connection 172. If connection 162 is lost, network device 100 may still publish or send STEP document(s) 112 to STEP repository 140 via connection 160 and/or receive STEP document(s) 132 from STEP repository 140 via connection 160. This arrangement permits network device 120 to continue to receive STEP document(s) 112 from STEP repository 140 via connection 170. Similarly, if connection 170 is lost, network device 120 may still publish or send STEP document(s) 132 to STEP repository 150 via connection 172 and/or receive STEP document(s) 112 from STEP repository 150 via connection 172. This arrangement also permits network device 100 to continue to receive STEP document(s) 132 from STEP repository 150 via connection 162. If connection 172 is lost, network device 120 may still publish or send STEP document(s) 132 to STEP repository 140 via connection 170 and/or receive STEP document(s) 112 from STEP repository 140 via connection 170. This arrangement permits network device 100 to continue to receive STEP document(s) 132 from STEP repository 140 via connection 160. While such an arrangement may sacrifice some network bandwidth in the interest of higher availability, the amount of sacrificed network bandwidth may be relatively small as, after the initial STEP documents, the STEP documents traversing the network may only include deltas from previous STEP documents rather than all of the service information and topology information known by a given network device.

According to the techniques of this disclosure, a device, such as network device 100 may be configured to create a first STEP document, the first STEP document comprising service and topology information. The device may be configured to send the first STEP document to a first STEP repository (e.g., STEP repository 140) for forwarding to at least one subscribing network device (e.g., network device 120) and send the first STEP document to the second STEP repository (e.g., STEP repository 150) for forwarding to the at least one subscribing network device.

While the example of FIG. 1 depicts two network devices and two STEP repositories, network 10 may include more than two network devices and/or more than two STEP repositories.

More information on STEP and session-based routers may be found in U.S. Pat. No. 11,153,202, issued on Oct. 19, 2021, and entitled "SERVICE AND TOPOLOGY EXCHANGE PROTOCOL," the entire content of each of which is incorporated herein by reference in its entirety.

Figure 2:
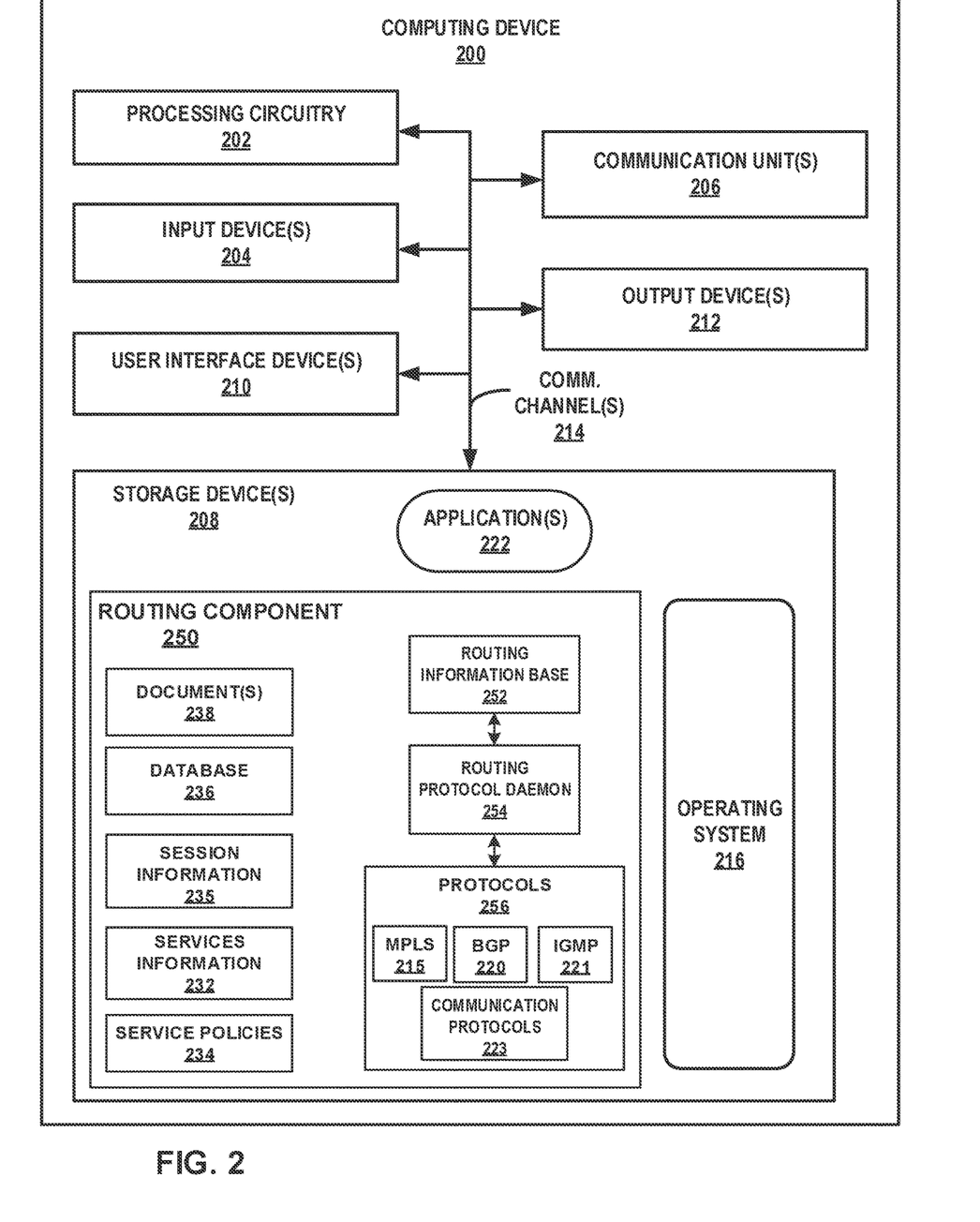
FIG. 2 is a block diagram illustrating an example network device in accordance with the techniques of the disclosure.

FIG. 2 is a block diagram illustrating an example computing device 200 in accordance with the techniques of the disclosure. In general, computing device 200 may be an example implementation of network device 100 or network device 120 of FIG. 1. FIG. 2 illustrates a particular example of a computing device 200 that includes processing circuitry 202 for executing any one or more of applications 222, routing component 250, or any other computing device described herein. Other examples of computing device 200 may be used in other instances.

Although shown in FIG. 2 as a stand-alone computing device 200 for purposes of example, a computing device that operates in accordance with the techniques of this disclosure may be any component or system that includes one or more processors or other suitable computing environment for executing software instructions and, for example, need not necessarily include one or more elements shown in FIG. 2 (e.g., communication units 206; and in some examples, components such as storage device(s) 208 may not be co-located or in the same chassis as other components). In some examples, computing device 200 may be implemented as a virtualized network function (VNF). In some examples, one or more aspects of computing device 200 can be run as one or more containers or as one or more applications within virtual machines of a Network Functions Virtualization (NFV) platform using, e.g., VirtIO and SRIOV network virtualization technologies, or on bare-metal servers. In some examples, computing device 200 is a physical network device, such as a switch, router, gateway, or other device that sends and receives network traffic.

As shown in the example of FIG. 2, computing device 200 includes processing circuitry 202, one or more input devices 204, one or more communication units 206, one or more output devices 212, one or more storage devices 208, and one or more user interface (UI) device(s) 210. Computing device 200, in one example, further includes one or more application(s) 222 and operating system 216 that are executable by computing device 200. Each of components 202, 204, 206, 208, 210, and 212 are coupled (physically, communicatively, and/or operatively) for inter-component communications. In some examples, communication channels 214 may include a system bus, a network connection, an inter-process communication data structure, or any other method for communicating data. As one example, components 202, 204, 206, 208, 210, and 212 may be coupled by one or more communication channels 214.

Processing circuitry 202, in one example, is configured to implement functionality and/or process instructions for execution within computing device 200. In some examples, processing circuitry 202 comprises one or more hardware-based processors. For example, processing circuitry 202 may be capable of processing instructions stored in storage device 208. Examples of processing circuitry 202 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 208 may be configured to store information within computing device 200 during operation. Storage device 208, in some examples, is described as a computer-readable storage medium. In some examples, storage device 208 is a temporary memory, meaning that a primary purpose of storage device 208 is not long-term storage. Storage device 208, in some examples, is described as a volatile memory, meaning that storage device 208 does not maintain stored contents when computing device 200 computer is turned off or powered down. Examples of volatile memories include random access memories (RAM), dynamic random access memories (DRAM), static random access memories (SRAM), and other forms of volatile memories. In some examples, storage device 208 is used to store program instructions for execution by processing circuitry 202. Storage device 208, in one example, is used by software or applications running on computing device 200 to temporarily store information during program execution.

Storage devices 208, in some examples, also include one or more computer-readable storage media. Storage devices 208 may be configured to store larger amounts of information than volatile memory. Storage devices 208 may further be configured for long-term storage of information. In some examples, storage devices 208 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 200, in some examples, also includes one or more communication units 206. Computing device 200, in one example, utilizes communication units 206 to communicate with external devices via one or more networks, such as one or more wired/wireless/mobile networks.

Communication units 206 may include a network interface, such as an Ethernet card, an optical transceiver, a radio frequency transceiver, or any other type of device that can send and receive information. Other examples of such network interfaces may include 3G and WiFi radios. In some examples, communication units 206 may include a plurality of high-speed network interface cards. In some examples, computing device 200 uses communication unit 206 to communicate with an external device. For example, computing device 200 uses communication unit 206 to communicate with other computing devices, such as network device 100, network device 120, STEP repository 140, and/or STEP repository 150 (all of FIG. 1) with which communication unit 206 is connected.

Computing device 200, in one example, also includes one or more user interface devices 210. User interface device(s) 210, in some examples, are configured to receive input from a user through tactile, audio, or video feedback. Examples of user interface devices(s) 210 include a presence-sensitive display, a mouse, a keyboard, a voice responsive system, video camera, microphone or any other type of device for detecting a command from a user. In some examples, a presence-sensitive display includes a touch-sensitive screen. In some examples, a user such as an administrator of network 10 may enter configuration data for computing device 200.

One or more output device(s) 212 may also be included in computing device 200. Output device(s) 212, in some examples, is configured to provide output to a user using tactile, audio, or video stimuli. Output device(s) 212, in one example, includes a presence-sensitive display, a sound card, a video graphics adapter card, or any other type of device for converting a signal into an appropriate form understandable to humans or machines. Additional examples of output device 212 include a speaker, a cathode ray tube (CRT) monitor, a liquid crystal display (LCD), or any other type of device that can generate intelligible output to a user.

Computing device 200 may include operating system 216. Operating system 216, in some examples, controls the operation of components of computing device 200. For example, operating system 216, in one example, facilitates the communication of one or more application(s) 222 with processing circuitry 202, communication unit(s) 206, storage device(s) 208, input device(s) 204, user interface device(s) 210, and output device(s) 212. Application(s) 222 may also include program instructions and/or data that are executable by computing device 200.

In some examples, processing circuitry 202 executes routing component 250, which determines routes of received packets and forwards the packets accordingly. Routing component 250 communicates with other routers, e.g., such as network device 100 or network device 120 in the example where they represent routers, to establish and maintain a computer network, such as network 10 of FIG. 1, for transporting network traffic between one or more customer or client devices (not shown). Routing protocol daemon (RPD) 254 of routing component 250 executes software instructions to implement one or more control plane networking protocols 256. For example, protocols 256 may include one or more routing protocols, such as Internet Group Management Protocol (IGMP) 221 and/or Border Gateway Protocol (BGP) 220, for exchanging routing information with other routing devices and for updating routing information base (RIB) 252, Multiprotocol Label Switching (MPLS) protocol 215, and other routing protocols. Protocols 256 may further include one or more communication session protocols, such as TCP, UDP, TLS, or ICMP.

RIB 252 may describe a topology of the computer network in which computing device 200 resides, and may also include routes through the shared trees in the computer network. RIB 252 describes various routes within the computer network, and the appropriate next hops for each route, i.e., the neighboring routing devices along each of the routes. RIB 252 may be a radix tree programmed into dedicated forwarding chips, a series of tables, a complex database, a link list, a radix tree, a database, a flat file, or various other data structures. In some examples, RIB 252 may be part of database 236. In some examples, RIB 252 may be an example of topology map 118 or topology map 138 of FIG. 1.

Session information 235 stores information for identifying sessions. In some examples, session information 235 is in the form of a session table. For example, services information 232 comprises one or more entries that specify a session identifier. In some examples, the session identifier comprises one or more of a source address, source port, destination address, destination port, or protocol associated with a forward packet flow and/or a reverse packet flow of the session. As described above, computing device 200 may perform session-based routing such that when routing component 250 receives a packet for a forward packet flow originating from one client device and destined for another client device, routing component 250 determines whether the packet belongs to a new session (e.g., is the "first" packet or "lead" packet of session 40). To determine whether the packet belongs to a new session, routing component 250 determines whether session information 235 includes an entry corresponding to a source address, source port, destination address, destination port, and protocol of the first packet. If an entry exists, then the session is not a new session. If no entry exists, then the session is new and routing component 250 generates a session identifier for the session and stores the session identifier in session information 235. Routing component 250 may thereafter use the session identifier stored in session information 235 for the session to identify subsequent packets as belonging to the same session.

Services information 232 stores information that routing component 250 may use to identify a service associated with a session. In some examples, services information 232 is in the form of a services table. For example, services information 232 comprises one or more entries that specify a service identifier and one or more of a source address, source port, destination address, destination port, or protocol associated the service. In some examples, routing component 250 may query services information 232 with one or more of a source address, source port, destination address, destination port, or protocol of a session for a received packet to determine a service associated with a session. For example, routing component 250 may determine a service identifier based on a correspondence of a source address, source port, destination address, destination port, or protocol in services information 232 to a source address, source port, destination address, destination port, or protocol specified by a session identifier. Routing component 250 retrieves, based on the service associated with the packet, one or more service policies 234 corresponding to the identified service. The service policies may include, e.g., a path failover policy, a Dynamic Host Configuration Protocol (DHCP) marking policy, a traffic engineering policy, a priority for network traffic associated with the session, etc. Routing component 250 applies, to the packet, the one or more service policies 234 that correspond to the service associated with the packet.

Computing device may receive configuration information, for example, via input device(s) 204 or communication unit(s) 206, may read the configuration information, and create STEP managers 262 and STEP clients 260. STEP managers 262 may include a plurality of STEP managers, such as STEP managers 108 and 110, or STEP managers 128 and 130 of FIG. 1. STEP clients 260 may include a plurality of STEP clients, such as STEP clients 114 and 116, or STEP clients 134 and 136 of FIG. 1.

Computing device 200 may include document(s) 238 which may be an example of documents(s) 112 or document(s) 132 of FIG. 1. Computing device 200 may also include database 236 which may be an example of database 106 or database 126 of FIG. 1.

In accordance with the techniques of the disclosure, computing device 200 may create a first STEP document (e.g., of STEP document(s) 238), the first STEP document comprising service and topology information. Computing device 200 may send the first STEP document to a first STEP repository (e.g., STEP repository 140 of FIG. 1), for example, via communication unit(s) 206, for forwarding to at least one subscribing network device (e.g., network device 100 or network device 120 of FIG. 1) and send the first STEP document to a second STEP repository (e.g., STEP repository 150 of FIG. 1), for example, via communication unit(s) 206 for forwarding to the at least one subscribing network device.

For example, computing device 200 may build a first STEP document that includes service and topology information known to computing device 200. Such information may include service information from services information 232 and/or service policies 234. Such information may include topology information, such as the identification of neighboring devices that neighbor computing device 200.

Figure 3:
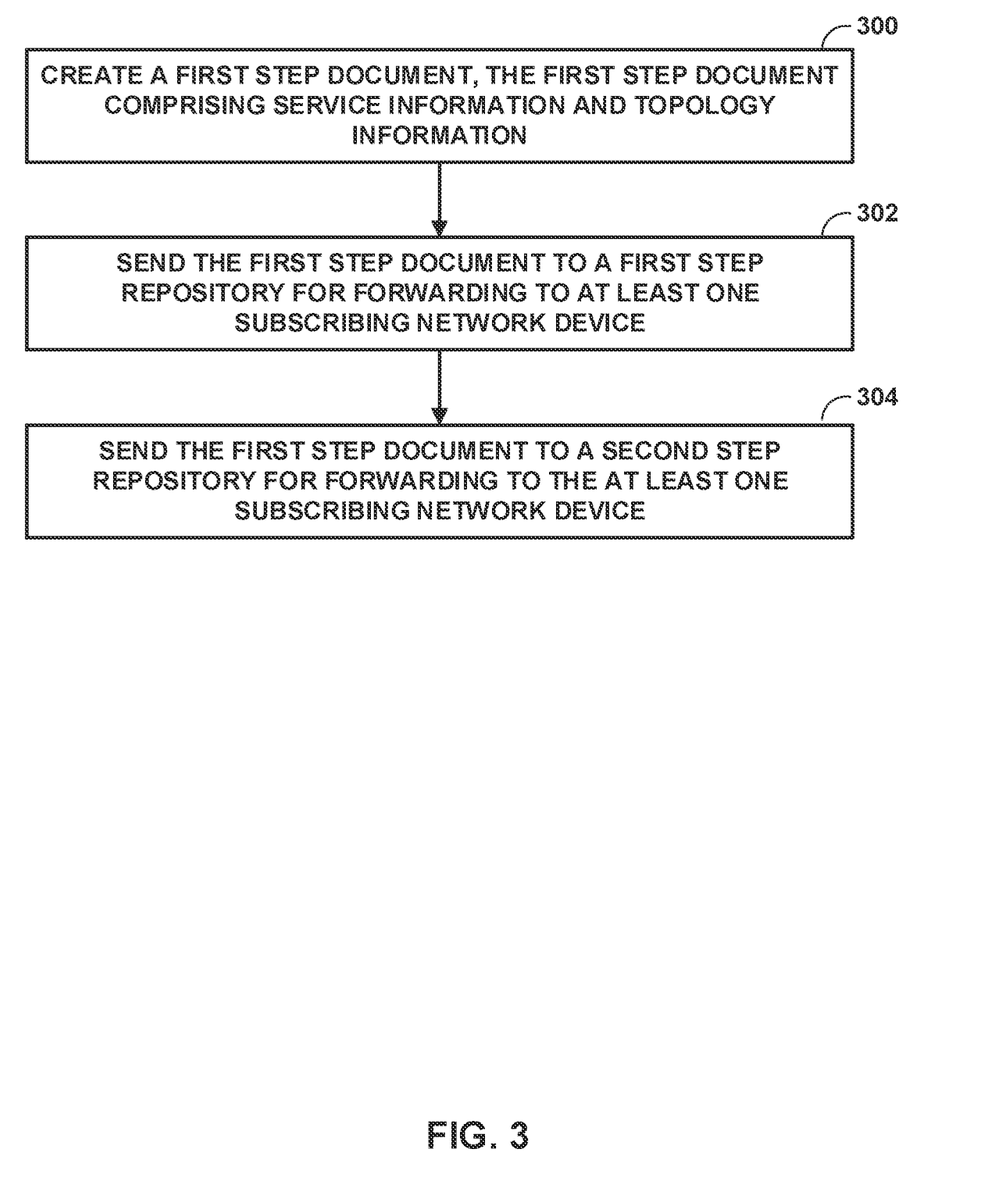
FIG. 3 is a flow diagram illustrating an example operation in accordance with the techniques of the disclosure.

FIG. 3 is a flow diagram illustrating an example operation in accordance with the techniques of the disclosure. While the example of FIG. 3 is described with respect to computing device 200 of FIG. 2, the techniques of FIG. 3 may be performed by other network devices.

Computing device 200 may create a first STEP document, the first STEP document comprising service information and topology information (300). For example, computing device 200 may create a STEP document that includes service information and topology information known to computing device 200. For example, computing device 200 may receive border gateway protocol (BGP) routes from neighboring devices and determine service information and topology information based on such routes. Computing device 200 may also store information relating to services in services information 232 and/or service policies 234. Computing device 200 may include service information and topology information in the first STEP document, which may be an initial STEP document.

Computing device 200 may send the first STEP document to a first STEP repository for forwarding to at least one subscribing network device (302). For example, computing device 200 may send the first STEP document to STEP repository 140 (FIG. 1). Computing device 200 may send the first STEP document to a second STEP repository (304). For example, computing device 200 may send the first STEP document to STEP repository 150 (FIG. 1). STEP repository 140 and STEP repository 150 may then forward the first STEP document to at least one subscribing network device (e.g., network device 100 or network device 120).

In some examples, the first STEP document comprises a JSON document. In some examples, computing device 200 may receive a second STEP document from the first STEP repository and receive the second STEP document from the second STEP repository. The second STEP document may comprise service information and topology information relating to another device. For example, computing device 200 may subscribe to STEP documents from the another network device and the first STEP repository and the second STEP repository may each send the second STEP document to computing device 200.

In some examples, computing device 200 may build a service and topology database based at least in part on at least one of the second STEP document received from the first STEP repository or the second STEP document received from the second STEP repository. In some examples, the service and topology database comprises a link status database. For example, computing device 200 may have a preferred STEP repository of the first STEP repository and the second STEP repository. For example, STEP manager proxy 104 (FIG. 1) may select a preferred STEP repository. Computing device 200 may use the second STEP document associated with the preferred STEP repository to build the link status database. If communication between the preferred STEP repository and computing device 200 is down or if the preferred STEP repository is down, then computing device 200 may use the second STEP document from another STEP repository to build the link status database.

In some examples, computing device 200 builds a topology map based at least in part on the second STEP document. For example, computing device 200 may build a LSDB—SPF topology map and route traffic based on the LSDB—SPF.

In some examples, computing device 200 may receive a third STEP document from the first STEP repository and receive the third STEP document from the second STEP repository. In some examples, the third STEP document comprises a delta of changes to at least one of the service information or the topology information of the second STEP document relating to the another device.

In some examples, computing device 200 may update the service and topology database based on at least one of the third STEP document from the first STEP repository or the third STEP document from the second STEP repository. For example, STEP manager proxy 104 (FIG. 1) may select a preferred STEP repository. Computing device 200 may use the third STEP document associated with the preferred STEP repository to update the link status database. If communication between the preferred STEP repository and computing device 200 is down or if the preferred STEP repository is down, then computing device 200 may use the third STEP document from another STEP repository to build the link status database. Once the preferred STEP repository comes back up, computing device 200 may determine whether computing device 200 needs to update or rebuild the service and topology database. For example, computing device may determine that a more recent STEP document than those used to create or update the service and topology database has been received, for example, by checking a version identifier associated with a STEP document. If a more recent STEP document has been received, computing device 200 may rebuild or update the service and topology database using the more recent STEP document.

In some examples, computing device 200 may create a delta STEP document, the delta STEP document comprising a JSON patch comprising a delta of changes in at least one of the service information or the topology information from the first STEP document. In some examples, computing device 200 may send the delta STEP document to the first STEP repository for forwarding to the at least one subscribing network device and send the delta STEP document to the second STEP repository for forwarding to the at least one subscribing network device.

While the techniques of this disclosure are discussed with respect to STEP repositories, these high availability techniques may be used for other data storage implementations that have similar usage characteristics to STEP repositories, in which each data record or table is always updated by the same network device.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

What is claimed is:

1. A network device comprising:
   one or more processors;
   memory coupled to the one or more processors, the memory storing instructions that upon execution cause one or more processors to:
      create a first service and topology exchange protocol (STEP) document, the first STEP document comprising service information and topology information;
      send the first STEP document to a first STEP repository device for forwarding to at least one subscribing network device, the first STEP repository device being separate from the network device; and
      send the first STEP document to a second STEP repository device for forwarding to the at least one subscribing network device, the second STEP repository device being separate from the network device and being separate from the first STEP repository device.

2. The network device of claim 1, wherein the first STEP document comprises a JavaScript Object Notation (JSON) document.

3. The network device of claim 1, wherein the instructions further cause the one or more processors to:
   receive a second STEP document from the first STEP repository device; and
   receive the second STEP document from the second STEP repository device,
   wherein the second STEP document comprises service information and topology information relating to another network device.

4. The network device of claim 3, wherein the instructions further cause the one or more processors to:
   build a service and topology database based at least in part on at least one of the second STEP document received from the first STEP repository device or the second STEP document received from the second STEP repository device.

5. The network device of claim 4, wherein the service and topology database comprises a link state database.

6. The network device of claim 4, wherein the instructions further cause the one or more processors to build a topology map based at least in part on the second STEP document.

7. The network device of claim 4, wherein the instructions further cause the one or more processors to:
   receive a third STEP document from the first STEP repository device; and
   receive the third STEP document from the second STEP repository device,
   wherein the third STEP document comprises a delta of changes to at least one of the service information or the topology information of the second STEP document relating to the another network device.

8. The network device of claim 7, wherein the instructions further cause the one or more processors to:
   update the service and topology database based on at least one of the third STEP document from the first STEP repository device or the third STEP document from the second STEP repository device.

9. The network device of claim 1, wherein the instructions further cause the one or more processors to:
   create a delta STEP document, the delta STEP document comprising a JSON patch comprising a delta of changes in at least one of the service information or the topology information from the first STEP document;
   send the delta STEP document to the first STEP repository device for forwarding to the at least one subscribing network device; and
   send the delta STEP document to the second STEP repository device for forwarding to the at least one subscribing network device.

10. The network device of claim 1, wherein the network device comprises a session-based router.

11. A method comprising:
   creating, by one or more processors of a network device, a first service and topology exchange protocol (STEP) document, the first STEP document comprising service information and topology information;
   sending, by the one or more processors of the network device, the first STEP document to a first STEP repository device for forwarding to at least one subscribing network device, the STEP repository device being separate from the network device; and sending, by the one or more processors of the device, the first STEP document to a second STEP repository device for forwarding to the at least one subscribing network device, the second STEP repository device being separate from the network device and being separate from the first STEP repository device.

12. The method of claim 11, wherein the first STEP document comprises a JSON document.

13. The method of claim 11, further comprising:
receiving, by the one or more processors of the network device, a second STEP document from the first STEP repository device; and
receiving, by the one or more processors of the network device, the second STEP document from the second STEP repository device,
wherein the second STEP document comprises service information and topology information relating to another network device.

14. The method of claim 13, further comprising:
building, by the one or more processors of the network device, a service and topology database based at least in part on at least one of the second STEP document received from the first STEP repository device or the second STEP document received from the second STEP repository device.

15. The method of claim 14, wherein the service and topology database comprises a link state database.

16. The method of claim 14, further comprising:
building, by the one or more processors of the network device, a topology map based at least in part on the second STEP document.

17. The method of claim 14, further comprising:
receiving, by the one or more processors of the network device, a third STEP document from the first STEP repository device; and
receiving, by the one or more processors of the network device, the third STEP document from the second STEP repository device,
wherein the third STEP document comprises a delta of changes to at least one of the service information or the topology information of the second STEP document relating to the another network device.

18. The method of claim 17, further comprising:
updating, by the one or more processors of the network device, the service and topology database based on at least one of the third STEP document from the first STEP repository device or the third STEP document from the second STEP repository device.

19. The method of claim 11, further comprising:
creating, by the one or more processors of the network device, a delta STEP document, the delta STEP document comprising a JSON patch comprising a delta of changes in at least one of the service information or the topology information from the first STEP document;
sending, by the one or more processors of the network device, the delta STEP document to the first STEP repository device for forwarding to the at least one subscribing network device; and
sending, by the one or more processors of the network device, the delta STEP document to the second STEP repository device for forwarding to the at least one subscribing network device.

20. A non-transitory computer-readable storage medium storing instructions, which, when executed, cause one or more processors of a network device to:
create a first service and topology exchange protocol (STEP) document, the first STEP document comprising service information and topology information;
send the first STEP document to a first STEP repository device for forwarding to at least one subscribing network device, the STEP repository device being separate from the network device; and
send the first STEP document to a second STEP repository device for forwarding to the at least one subscribing network device, the second STEP repository device being separate from the network device and being separate from the first STEP repository device.

* * * * *